United States Patent

[11] 3,572,958

[72] Inventor: Jens Kure-Jensen, Schenectady, N.Y.
[21] Appl. No. 828,287
[22] Filed May 27, 1969
[45] Patented Mar. 30, 1971
[73] Assignee General Electric Company

[54] ELECTROHYDRAULIC CONTROL WITH THROTTLE PRESSURE COMPENSATOR
11 Claims, 3 Drawing Figs.

[52] U.S. Cl. ..... 415/17
[51] Int. Cl. ..... F01b 25/00
[50] Field of Search ..... 415/15, 17; 60/73, 39.25; 137/21, 26

[56] References Cited
UNITED STATES PATENTS

| | | | |
|---|---|---|---|
| 3,097,488 | 7/1963 | Eggenberger et al. | 415/17 |
| 3,097,490 | 7/1963 | Callan et al. | 60/73 |
| 3,238,376 | 2/1966 | Ernst et al. | 415/17 |
| 3,340,883 | 9/1967 | Peternel | 415/17 |
| 3,446,224 | 5/1969 | Zwicky, Jr. | 415/17 |

Primary Examiner—C. J. Husar
Attorneys—William C. Crutcher, Joseph B. Forman, Frank L. Neuhauser and Oscar B. Waddell ABSTRACT: An adaptive control system with an electrical throttle pressure compensator is disclosed for adjusting the gain of the control valves of a prime mover in a manner inversely proportional to the instantaneous throttle pressure. In one embodiment a first stage pressure feedback goes into service automatically when the load increases above a certain low level. The feedback operates to further reduce changes in incremental regulation so as to supplement the action of the throttle pressure compensator in reducing the effects of varying throttle pressure. Upon the failure of one or more of the critical components of the throttle pressure compensator or feedback loop, the gain of the overall system is caused to go to a safe value so as to preclude overloading of the prime mover.

Patented March 30, 1971

INVENTOR:
JENS KURE-JENSEN,
BY W.C. Crutcher
HIS ATTORNEY.

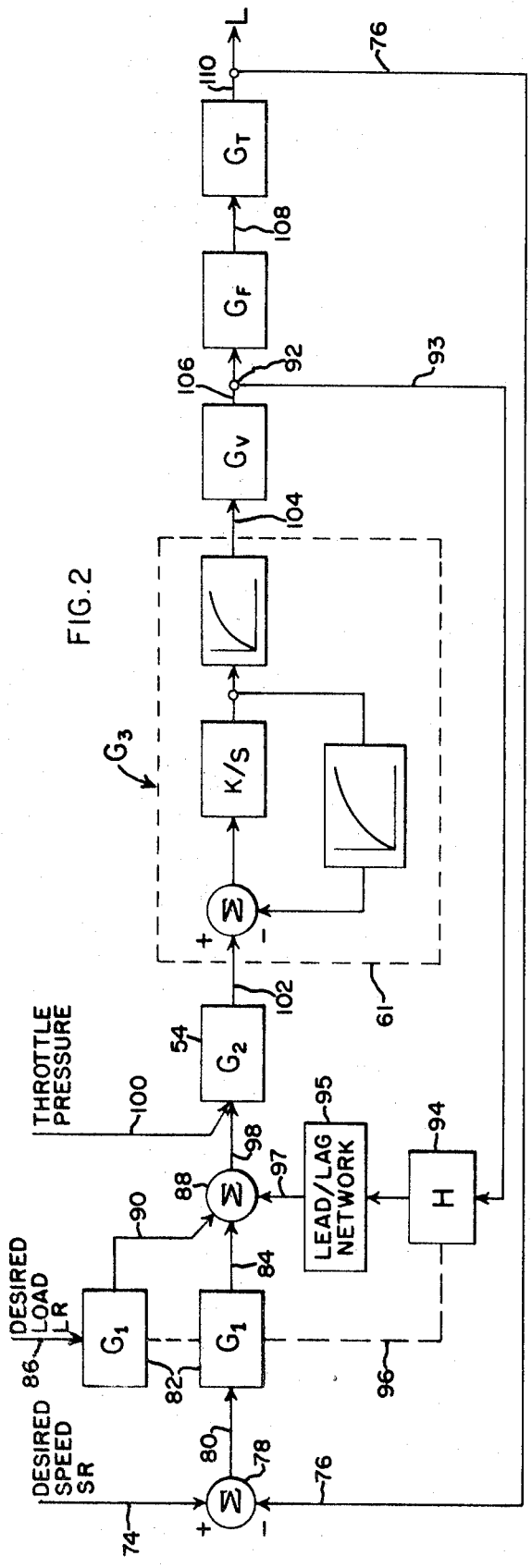
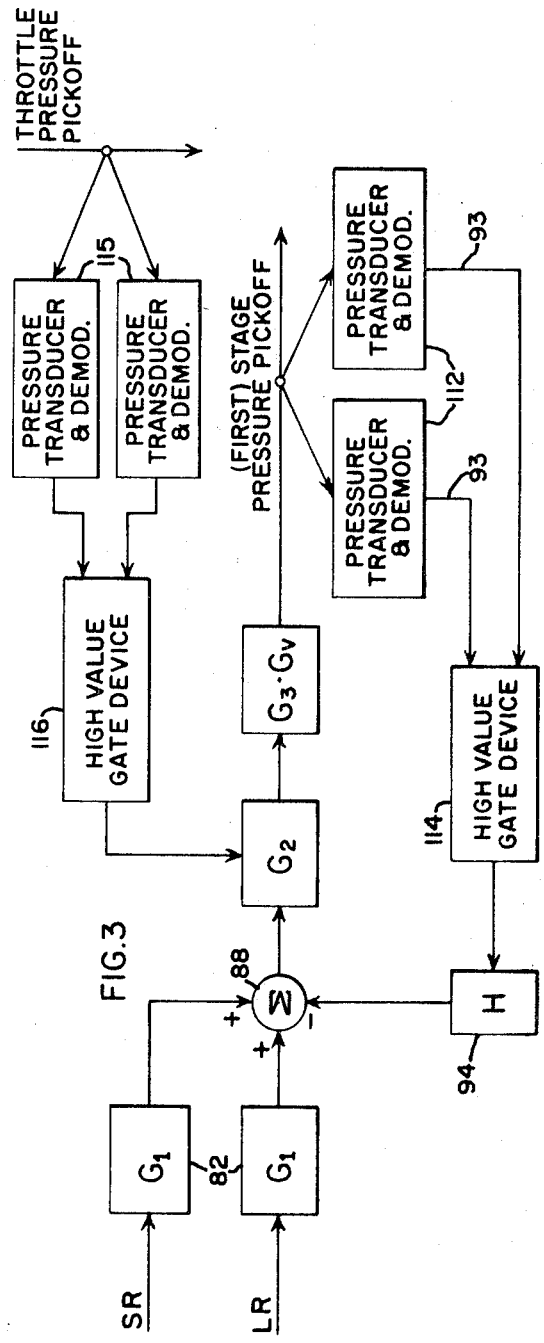
INVENTOR:
JENS KURE-JENSEN,
BY W. C. Crutcher
HIS ATTORNEY.

ELECTROHYDRAULIC CONTROL WITH THROTTLE PRESSURE COMPENSATOR

BACKGROUND OF THE INVENTION

In general, this invention relates to control systems for prime movers such as stream turbine power plants. More particularly, it relates to an improved electrohydraulic control system which utilizes a throttle pressure compensator to reduce the nonlinearity of the load output versus load reference.

Electrohydraulic control systems for turbine power plants generally provide more flexibility than mechanical hydraulic control systems. This is particularly true as the power plants become more complex, since relatively inexpensive circuits can be used to modify the response of the turbine and can be more readily adjusted than their mechanical counterparts.

One of the more favorable characteristics of the electrohydraulic control system is the facility with which the various conditions of pressure, temperature and motive fluid flow may be finely stabilized using conventional electrical components. Various compensator networks and feedback loop systems, which are known in the electrical arts, may be utilized to control a power plant so as to closely approach ideal performance curve operation.

When operating a power plant which includes prime movers with variable throttle pressures, the need for pressure compensation and system stabilization becomes desirable. In designing control valve positioning systems, it is necessary to compensate for varying throttle pressure in order to provide a desired nearly straight line regulation curve. Nuclear steam supply systems of the PWR (pressurized water reactor) type are often designed so that the throttle pressure of the steam available at the turbine main stop valves exhibits both a transient variation and a considerable droop from no load to rated load. Further, the extent of droop as well as the steam pressure at rated load can not always be predicted with great accuracy. Generally, in order for a prime mover to properly operate with such a nuclear steam supply system, the turbine control system must be designed to follow a curve of minimum throttle pressure v. steam flow at steady state. The turbine and its control valves must be designed to pass the rated flow at the throttle pressure existing at the main stop valves at rated output of the nuclear steam supply system which throttle pressure is the lowest point of the plotted pressure range. At higher throttle pressures than this lowest point, the control valves will have an excess flow capacity which would cause nonlinear regulation characteristics. Likewise, overload could result if the pressure does not follow the design steady state curve during load changes or even during steady state operation.

Therefore, in using a nuclear steam supply system, a power plant control system must be provided which compensates for the variation in throttle pressure as the load is varied from no load to rated load and at steady state. Also, an integral system should be included to further reduce any instantaneous transient fluctuations in the regulation of the control valves which reduction would further reduce the influence of a varying throttle pressure on the operation of the control valves. As always, safety is an overriding consideration and means must be provided for insuring that the prime mover will not overspeed if a component of the overall power plant control system should fail.

Accordingly, one object of the present invention is to provide a control system which will adapt itself to a steam pressure which changes as load is changed in such a manner that a near linear relationship will exist between load demand and load produced.

Another object of the invention is to have the aforementioned adaptation take place even if the actual steam pressure variation departs from predicted design variation.

Still another object of the invention is to provide a control system which will compensate for varying throttle pressure to a prime mover and will not overspeed the prime mover if a critical component of the system should fail.

SUMMARY OF THE INVENTION

Briefly stated, the invention is practiced by providing a throttle pressure compensator to adjust the gain of the control valves of a prime mover in a manner inversely proportional to the instantaneous throttle pressure which is sensed just ahead of the turbine control valves. In another feature of the invention, means are provided for adjusting the gain of the system to a safe value in case of a failure of one or more of the vulnerable critical components of the overall compensator and feedback loop network.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 2 is a simplified functional block diagram of the turbine power plant depicted as a servo mechanism;

FIG. 3 is a block diagram of the throttle pressure compensator and stage pressure feedback system incorporating redundant feedback signal safety features.

OVERALL SCHEMATIC DIAGRAM (FIG. 1)

Figure 1:
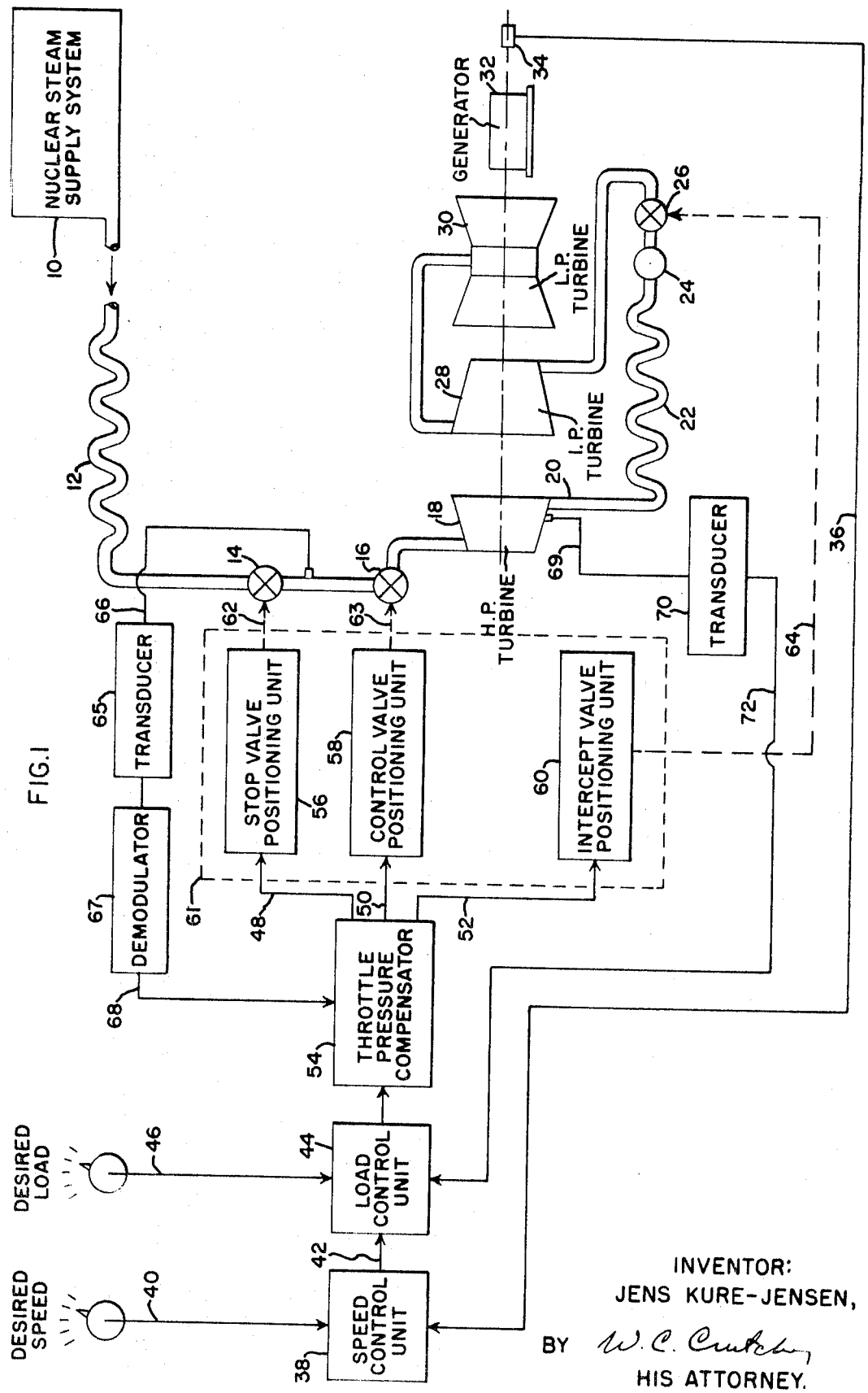
FIG. 1 is a simplified schematic diagram of a reheat turbine power plant with steam provided by a nuclear steam supply system and controlled by an electrohydraulic control system.

Referring now to the drawings in which like numerals are used to indicate like parts throughout the various views thereof, FIG. 1 shows steam flowing from a nuclear steam supply system 10 through a superheater 12 (if desired) to a main stop valve 14. The valve 14 admits steam to one or more control valves indicated by 16 which, in turn, control admission of steam to the high pressure turbine 18. Exhaust steam from turbine 18 flows through conduit 20 to reheater 22 and, thence, through a reheat stop valve 24 and an intercept valve 26 to an intermediate pressure turbine 28. The steam then flows through a low pressure turbine 30, which, together with the high pressure turbine 18 and intermediate pressure turbine 28, drives a load such as an electric generator 32.

A speed sensing device 34, such as a tachometer generator or variable reluctance pickup, transmits a signal indicating actual speed through line 36 to a speed control unit 38 where the actual speed signal is compared with a desired or reference speed signal 40. The error in speed, if any, is transmitted through line 42 to a load control unit 44 where it is further modified and then summed with a desired or reference load signal 46. Valve positioning signals in lines 48, 50, and 52 are derived in the load control unit 44 and are modified within a throttle pressure compensator 54 before being transmitted to a stop valve positioning unit 56, a control valve positioning unit 58, and an intercept valve positioning unit 60, respectively. For the sake of simplicity, the valve positioning units 56, 58 and 60 will be grouped into and indicated as one valve positioning unit 61. The valve positioning unit 61 moves the respective valves to the proper position through conventional servosystems indicated by the dotted lines 62, 63 and 64.

The throttle pressure compensator, which comprises a significant portion of the present invention, is in operation at all times and receives an electrical input signal from a transducer 65. The steam inlet throttle pressure is communicated through conduit 66, from a point in the steam supply line just downstream of the stop valve 14, to the transducer 65. It is this pressure which actuates the transducer 65 which, in turn, generates an electrical signal which is modified in a demodulator 67 and is transmitted to the throttle pressure compensator 54 through a lead 68. The throttle pressure compensator 54 is designed to adjust the gain of the control valves in a manner inversely proportional to the instantaneous throttle pressure. Since the flow capacity of a control valve is proportional to the pressure ahead of the valve, the described action will correctly compensate for the varying throttle pressure.

In one embodiment of this invention, a turbine stage pressure feedback loop is provided to reduce incremental changes in valve regulation and thereby to cooperate with the throttle pressure compensator 54 in reducing the effects of throttle pressure variations. In FIG. 1, a first stage pressure is communicated through conduit 69 to a transducer 70 which generates an electrical signal representing the sensed pressure. The electrical signal is then transmitted through lead 72 to the load control unit 44 in order to reduce changes in incremental regulation.

The valve positioning servos included in unit 61 may be of the type described in FIG. 2 of U.S. Pat. No. 3,403,892 or in FIGS. 2 and 3 of U.S. Pat. No. 3,407,826, both of which are incorporated by reference herein; they serve to position the valves 14, 16 and 26 in proportion to the magnitude of a suitable electrical input signal. The control valve positioning unit 58 preferably has additional provisions for opening control valves 16 in sequence, if there are a plurality, by applying electrical biasing signals of various magnitudes to the individual control valve servos, as more particularly described in U.S. Pat. No. 3,097,488 which issued Jul. 16, 1963 on an application of Markus A. Eggenberger et al. and is assigned to the assignee of the present application. For the purpose of the present application, however, the overall valve positioning unit 61 can be thought of as operating a single "equivalent" control valve (substituted for the group of individual control valves 14, 16 and 26), with such nonlinearity of operation as to make pressure feedback helpful (but not necessary for the operation of this invention).

The speed and load control units 38 and 44 serve to compare actual speed signals with a "desired" speed signal and then to superimpose thereon a "desired load" signal. These input signals may be converted into analogue quantities, by means well known in the art, and then are summed within the control units 38 and 44. Thus, the electrical outputs from the load control unit 44 set the valve positions as desired and constantly correct the valve positions in accordance with the changing inputs to the control units. Digital signals and summing techniques may also be employed.

For the purpose of simplifying the present description, it will be assumed that the overall valve positioning unit 61 is controlling the admission of steam to the turbine and that the speed is substantially constant. That is to say, the generator is connected to an electrical system fed by other similar generators and this electrical interconnection tends to hold the speed of the generator 32 substantially constant at the speed of the other interconnected generators. Hence, there will normally be an insignificant "speed error signal" appearing in line 42 and primary control will be carried out by means of adjusting the desired load signal 46 so as to select the share of the total load on the interconnected generators which is to be carried by the power plant.

FIG. 2 illustrates a functional block diagram of the turbine power plant as a servo mechanism when operating on the control valve 16. The blocks represent the transfer functions of the various control system elements. The "desired speed" reference signal SR in line 74 is summed with a negative speed feedback signal from line 76 in a summer 78 to provide a speed error signal in line 80. An input gain correction circuit 82 operating as amplifier $G_1$ modifies the speed error signal in accordance with the desired speed regulation (valve movement per increment of speed change), to produce a modified speed error signal in line 84.

As mentioned previously, when generator 32 is "on the line" (connected to a distribution system containing other similar generators), the speed error signal in circuit 82 will be substantially zero and the elements 74—84 maybe disregarded. Load is added to or taken off the turbine by changing the "desired load" reference input signal LR in line 86 and applying it to summer 88 as a positive signal through line 90. The circuit 82 (blocks $G_1$) modifies the load signal in line 90 as it did the speed error signal in line 80. A pressure feedback signal is derived from the first stage of the turbine at point 92 and is applied through line 93, through feedback amplifier 94, (block H), to the summer 88 as a negative pressure signal. A lead/lag circuit 95 is interposed between amplifier 94 and summer 88 to stabilize the transient characteristics of the signals passing therethrough. The lead/lag circuit 95 is connected to the summer 88 through line 97. The input gain correction circuit 82 is mechanically coupled with the feedback amplifier H as indicated by the dotted line 96. The purpose for this couple 96 will be explained later in reference to the safety features of the invention. The effects of the feedback loop including the lead/lag compensating transfer function H on the overall system are generally known to those skilled in the art and a discussion may be seen in U.S. Pat. No. 3,097,490.

The signals from lines 84, 90 and 97 are compared in summer 88 and an error signal is supplied therefrom through line 98 to the throttle pressure compensating unit 54 having a transfer function $G_2$. A signal representing throttle pressure is supplied to the compensating unit 54 through line 100 and the transfer function $G_2$ serves to adjust the valve positioning signal in line 98 in a manner inversely proportional to the instantaneous throttle pressure $$\left(G_2 = \frac{P_o}{P_T} = \frac{\text{Throttle pressure at rated load}}{\text{Instantaneous throttle pressure}}\right)$$

By this operation, the control valve 16 will be opened a lesser amount when there is a high throttle pressure and a greater amount when there is a low throttle pressure.

The valve positioning signal which appears in line 102 and has been modified within the throttle pressure compensator 54 is fed to overall valve positioning unit 61 which operates the aforementioned single equivalent control valve (including valves 14, 16 and 26). The valve positioning unit 61 exhibiting an overall transfer function $G_3$ includes a number of additional electrical elements to compensate for valve position versus flow nonlinearities through the use of electrical "cams," which are known to the art.

The flow of steam through the valves of large steam turbines presents a nonlinear problem since the flow change is much greater for a given valve position change near the closed end of the valve travel than it is near the open end. This characteristic of a steam valve results in a nonlinear gain between a reference signal calling for flow and the actual steam flow.

Since steam flow is proportional to load, the ultimate desired quantity of the turbine, it is desirable to have linear operation between the load reference signal in line 86 and the actual flow through the v. valves. *This is accomplished in part by the use of electrical "cams" as previously mentioned.*

Referring to FIGS. 1 and 2, the valve position represented by line 104 produces the steam in line 106 and the remaining nonlinearity of steam flow with respect to valve position is represented by block $G_v$. The steam in line 106 is that which is immediately downstream of the control valve 16 and is at the entry to the high pressure turbine 18. When steam passes through the high pressure turbine 18, represented by block $G_F$, the first stage pressure manifests itself as a torque on the high pressure turbine rotor, depicted by line 108. The steam flowing from the high pressure turbine 18 then enters the reheater 22, the intermediate pressure turbine 28 and the low pressure turbine 30 to manifest itself in line 110 as load or speed. Associated time lags, due primarily to the relatively long time constant required to build the pressure in the reheater 22 and interconnecting piping (caused by their volumes), are represented by transfer function $G_T$. Of course, the added torque created by the reheat pressure which is supplied to the intermediate and low pressure turbines diminishes the effect of $G_T$.

OPERATION WITH STAGE PRESSURE FEEDBACK UTILIZED (FIG. 2)

The throttle pressure compensator 54, which was discussed earlier in the specification, is in operation at all times to reduce the effects of varying throttle pressure. As previously mentioned a stage pressure feedback is not essential to the operation of this invention but should it be applied a further linearization in load reference v. actual load will result. The first stage feedback loop cooperates with the throttle pressure compensator to further reduce the varying throttle pressure effects by automatically cutting into operation to reduce changes in incremental regulation, when the load on the power plant exceeds a certain low level, (e.g. 10 percent).

In analyzing the first stage feedback operation of the present invention in reference to FIG. 2, the respective transfer function symbols will indicate the steady state gain. For control purposes it is generally assumed herein that the variation of first stage pressure v. load (FSP v. L) is linear; i.e. that the steady state value of $G_F$ is 1.0. With this assumption and in reference to the servo mechanism diagram of FIG. 2 the load response in line 110 to a change in load reference in line 86 will be:

$$(1) \quad \frac{L}{LR} = G_1 \frac{G_2 \cdot G_3 \cdot G_V}{1 + [H \cdot G_2 \cdot G_3 \cdot G_V]} \cdot G_F \cdot G_T$$

The response of the turbine and reheater $G_F \cdot G_T$ is assumed to be acceptable for proper load control aNd its steady state value is assumed to be unity so that it will not be considered further. For slow changes in load, which changes are the more usual type and in which each point in time is quasi-steady state, the load v. load reference, i.e. ($Lv.LR$), can be described by:

$$(2) \quad \frac{L}{LR} = G_1 \frac{G_2 \cdot G_3 \cdot G_V}{1 + [H \cdot G_2 \cdot G_3 \cdot G_V]}$$

The nonlinear feedback of the valve positioning unit 61, which is designed with electrical "cams" as previously discussed is designed so that as nearly as possible $G^* = G_3 \cdot G_V = 1.0$ over the entire load range as long as the throttle pressure $P_T$ is constant. $G_2$ will have to be unity for $P_T$=constant. Under this condition, equation (2) becomes:

$$(3) \quad \frac{L}{LR} = G_1 \frac{G^*}{1 + HG^*} = \text{overall gain} = M$$

If $G^*$ is unity then $$\frac{L}{LR} = \frac{G_1}{1 + H}$$

Therefore, if $G^*$ is unity, it is seen that we must have $G_1 = 1 + H$ to obtain $$\frac{L}{LR} = 1.0$$

at steady state and with first stage pressure feedback in service with gain $H$. It can therefore be seen that first stage pressure feedback can, to a treat degree, reduce the effect of departures from the ideal value of $G^* = G_3 V$ = valve position unit response times valve response where the throttle pressure is constant.

Now the effect of the first stage pressure on the influence of varying throttle pressure must be considered. The first stage pressure feedback loop improves the linearity of the load control by reducing the influence of variations in $G^* = G_3 \cdot G_V$ from unity. It has been found that if the nonlinear feedback of the valve positioning unit 61, i.e., the electrical "cams" previously discussed, will limit the variation of $G^* = G_3 \cdot G_V$ between 0.5 and 2.0, the first stage pressure feedback loop will further limit the changes as follows:

The above shown tabulation demonstrates the incremental regulation at points where $G^* = G_3 \cdot G_V$ does not equal 1.0. In the PWR type nuclear steam supply systems, the varying throttle pressure $P_T$ will change $G^*$ by changing the valve gain $G_V$. If in changing from rated load to no load, $G_V$ would increase from, for instance, 1.0 to 2.0, such an increase would result in a change in overall gain $M$ from 1.0 to 1.14 with $H=3$ or 1.0 to 1.09 with $H=5$. It has therefore been found that first stage pressure feedback, in service with a gain of 3—5, can reduce the influence of up to a 50 percent change in throttle pressure to within very acceptable levels. Two effects in the use of first stage pressure feedback, however, must be considered, i.e. stability and the consequences of losing the stage pressure feedback signal. The consequences of losing the throttle pressure signal will also be considered.

Stability may be provided by including the lead/lag network 95 in the feedback loop which has been found to permit $H$ to safely approach a maximum value of 8.0, which might occur when using nonideal electrical "cams." FIG. 3 shows a scheme for protecting the system against loss of pressure signals. According to this scheme, redundant stage pressure signals may be generated in transducer/demodulators 112 and passed through a high value gate device 114 which will pass only the highest feedback signal. In this manner, an erroneously low feedback signal will be rejected from the control system. In a similar manner redundant throttle pressure signals may be generated in transducer/demodulators 115 and passed through a high value gate 116 which will pass only the greater throttle pressure signal.

Another approach for the protection against loss of stage pressure feedback signal is to reduce $G_1$ to 1.0 and $H$ to 0 when the feedback signal drops below a certain low level, e.g. 10 percent. Through this operation, the overall gain $$M = \frac{G_1}{1 + H}$$

(equation 3) would become unity and no damage by way of overload to the turbine would result. This procedure is generally known to the art. The mechanical coupling indicated in FIG. 2 as dotted line 96 may be used to provide a simple and reliable method of implementing this operation by so changing the value of $H$ and $G_1$ as discussed above. Such an operation makes it impossible to use first stage pressure feedback near zero load, but use near zero load is inherently very uncertain because of the highly nonlinear behavior of first stage pressure near no load.

Thus, it will be seen that a throttle pressure compensator has been provided to adjust the gain of the control valves of a prime mover in a manner inversely proportional to the instantaneous throttle pressure. Since the flow capacity of a control valve is dependent on the pressure ahead of that valve, the operation will properly correct for varying throttle pressure. As a result, the load reference versus actual load curves, become substantially linear at varying throttle pressures. Likewise, a stage pressure feedback loop may be provided to improve the linearity of load control and provision has been made within the feedback loop to insure signal stability and safe operation in case of feedback signal loss. The redundant feature may also be applied to throttle pressure signal generation. Electrical "cams" are included in the valve positioning network to compensate for valve position v. flow nonlinearity in the control valves. The net result of the cooperation of the throttle pressure compensator, stage pressure feedback and

|  | H=3 | | H=5 | | H=0 [1] |
|---|---|---|---|---|---|
| $G^* = G_3 \cdot G_V$ | Overall gain=M | Incremental speed regulation, percent | Overall gain=M | Incremental speed regulation, percent | Incremental speed regulation, percent |
| 0.5 | .8 | 6.25 | .86 | 5.8 | 10 |
| 1.0 | 1.0 | 5.0 | 1.00 | 5.0 | 5 |
| 2.0 | 1.14 | 4.4 | 1.09 | 4.6 | 2.5 |

[1] No Ff P.

the electrical "cams" is that a nuclear steam supply system of the PWR type may be efficiently used in connection with a conventional power plant regardless of the unfavorable characteristics of a resulting varying throttle pressure in running a turbine up from no load to rated load and in steady state operation.

While there has been described what is, at present, considered to be the preferred embodiment of the invention, it will be understood that various modifications may be made therein, and it is intended to cover in the appended claims all such modifications as fall within the true spirit and scope of this invention.

What is claimed as new and is desired to be secured by Letters Patent of the United States is:

I claim:

1. In a steam turbine power plant having valve means and a turbine, the combination of:
   a. control means for positioning said valve means in response to a first electrical signal representing a desired steam flow through said valve means; and
   b. first means for modifying the effect of said first signal on the valve means, said first means responsive to instantaneous throttle pressure and operable to modify said first signal so as to adjust the gain of said valve means in a manner inversely proportional to the instantaneous throttle pressure.

2. The device according to claim 1 with second means to furnish an electrical feedback signal to said control means for further modifying the effect of said first electrical signal on the valve means, said electrical feedback signal representing turbine stage pressure.

3. The device according to claim 2 with the addition of third means for reducing the overall gain of the control means in response to the failure of one or more critical components of said first or second means.

4. A device according to claim 1 with the addition of electrical "cam" means to compensate for valve position versus steam flow nonlinearities.

5. In a steam power plant having valve means and electrohydraulic control means including a load control unit which supplies a load control signal to a valve positioning unit, the improvement comprising:
   a. means for supplying to the electrohydraulic control means a signal representing the instantaneous throttle pressure of the power plant; and
   b. means for modifying the load control signal so that the gain of the valve means is varied inversely with respect to the magnitude of said signal representing the instantaneous throttle pressure.

6. A device according to claim 5 wherein the means for supplying a signal representing instantaneous throttle pressure comprises a high value gate device and means for supplying redundant throttle pressure signals to said high value gate device, said high value gate device operable to prevent an erroneously low throttle pressure signal from passing to said electrohydraulic control means.

7. An electrohydraulic control system for controlling a steam power plant comprising:
   a. a speed control unit;
   b. means for supplying a speed reference signal representing desired speed to said speed control unit;
   c. means for supplying an actual speed signal to said speed control unit;
   d. said speed control unit operable to compare said speed reference signal and said actual speed signal to provide a first error signal;
   e. a load control unit;
   f. means for supplying a load reference signal representing a desired load to said load control unit;
   g. feedback circuit means for supplying a signal corresponding to the magnitude of first stage pressure to said load control unit;
   h. said load control unit operable to compare said first error signal, said load reference signal and said signal corresponding to the magnitude of first stage pressure to produce a second error signal;
   i. a throttle pressure compensator;
   j. means for supplying to said throttle pressure compensator a signal corresponding to the magnitude of instantaneous throttle pressure;
   k. said throttle pressure compensator operable to modify said second error signal in response to the magnitude of said signal corresponding to instantaneous throttle pressure, so that the magnitude of said second error signal is modified in a manner inversely proportional to the magnitude of said signal corresponding to instantaneous throttle pressure;
   l. steam control valves for controlling the steam flow in the steam power plant; and
   m. a valve positioning unit for positioning said steam control valves in response to said modified second error signal.

8. A device according to claim 5 with the addition of electrical "cam" means connected with said valve positioning unit to compensate for valve position versus flow nonlinearities.

9. A device according to claim 5 with the addition of lead/lag network means connected in said feedback circuit means to stabilize transient fluctuations in the signals passing therethrough.

10. A device according to claim 5 with the addition of safety means for causing the gain of said load control to go to 1.0 and the gain of said feedback circuit means to go to zero when the signal in said feedback circuit means reaches a predetermined low value.

11. A device according to claim 5 wherein said feedback circuit means comprises a high value gate device and means for supplying redundant first stage pressure signals to said high value gate device, said high value gate device operable to prevent an erroneously low first stage pressure signal from passing to said load control unit.

UNITED STATES PATENT OFFICE
CERTIFICATE OF CORRECTION

Patent No. 3,572,958　　　　　　Dated March 30, 1971

Inventor(s) Jens Kure-Jensen

It is certified that error appears in the above-identified patent and that said Letters Patent are hereby corrected as shown below:

Claims 8, 9, 10 and 11, line 1, "A device according to claim 5" should read -- A device according to claim 7 --.

Signed and sealed this 7th day of November 1972.

(SEAL)
Attest:

EDWARD M. FLETCHER, JR.　　　　　　ROBERT GOTTSCHALK
Attesting Officer　　　　　　　　　　Commissioner of Pate